Feb. 22, 1938.   F. A. ENGEL ET AL   2,108,848
PIPE JOINT
Filed June 30, 1934   3 Sheets-Sheet 1
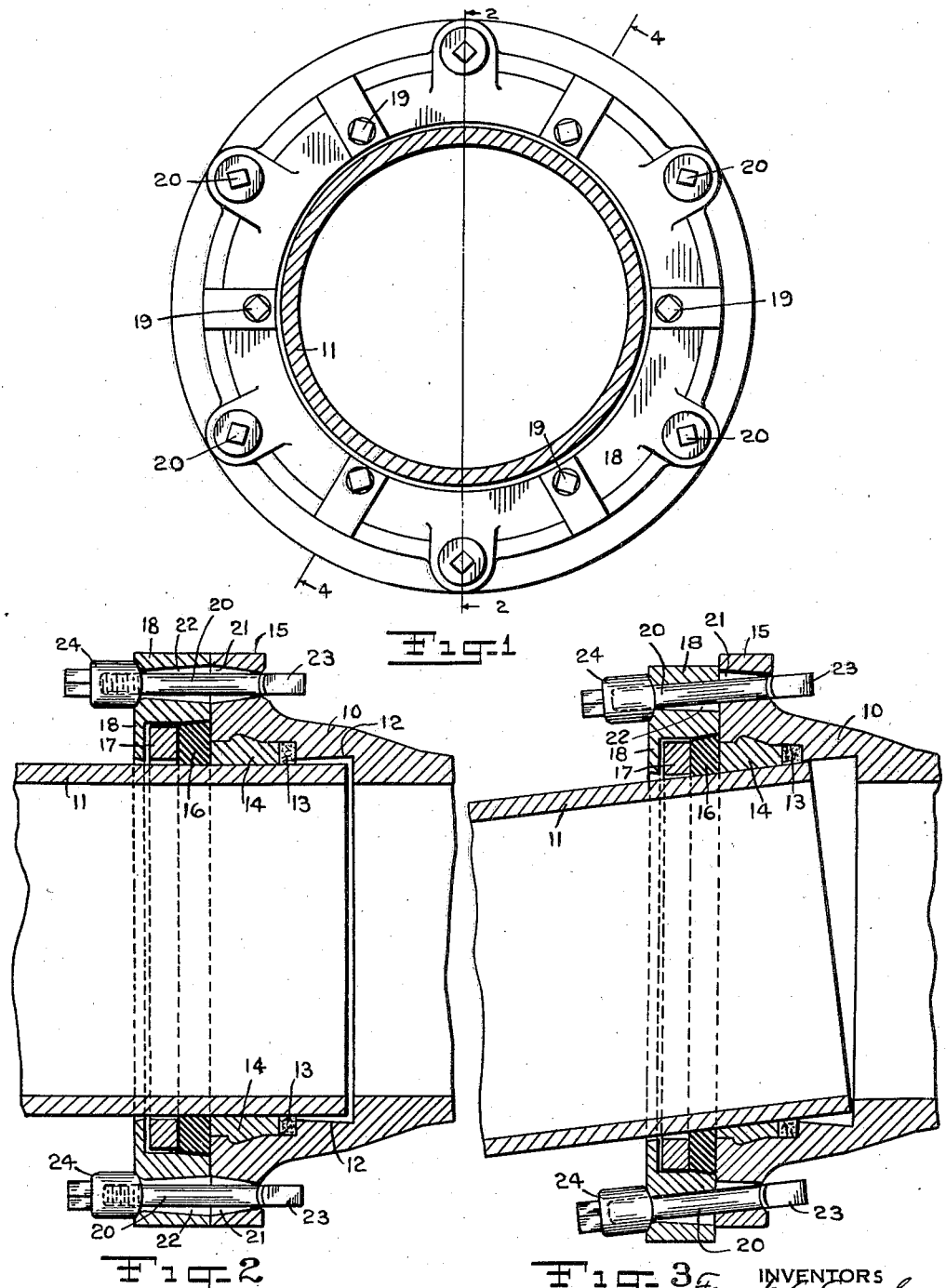

Feb. 22, 1938.    F. A. ENGEL ET AL    2,108,848

PIPE JOINT

Filed June 30, 1934    3 Sheets-Sheet 2

INVENTORS
Frank A. Engel
Franklin Hudson
BY
S. J. Cox
ATTORNEY

Feb. 22, 1938. F. A. ENGEL ET AL 2,108,848
PIPE JOINT
Filed June 30, 1934 3 Sheets-Sheet 3

INVENTORS
Frank A. Engel
Franklin Hudson
BY
S. J. Cox
ATTORNEY

Patented Feb. 22, 1938

2,108,848

UNITED STATES PATENT OFFICE 2,108,848

PIPE JOINT

Frank A. Engel and Franklin Hudson, Roselle, N. J., assignors to Inner-Tite Clamp Corporation, Elizabeth, N. J., a corporation of New Jersey Application June 30, 1934, Serial No. 733,216

9 Claims. (Cl. 285—134)

The present improvements relate to pipe joints and couplings adapted to insure an effective seal and to prevent leakage about the joint. More particularly, the improvements are directed to mechanical joints and couplings for fluid conduits, such as gas mains and the like, and are adaptable for either cast iron or steel pipes.

A primary object of the improvements, is to provide an improved joint which is efficient, dependable and durable, wherein the parts are readily applied or replaced.

A further object, among others, is to provide a novel pipe joint sealing means which may be used with equal effectiveness, with straightaway pipe sections whether concentrically or eccentrically aligned, or with pipe sections disposed at an angle to each other.

Another object is to provide an improved sealing means which will effectively maintain itself in sealing condition irrespective of subsequent movements of the sections.

A further object is to provide a pipe joint structure adapted to a plurality of types of joints, and one which is self operative, and requires no servicing. Another object is to provide a novel pipe joint structure wherein the gasket may be replaced without reducing the pressure in the pipe line.

The provision of new and effective details of pipe joint structure as well as the improvements of pipe joints in general constitutes further objects of the invention. Other objects and advantages will be apparent upon reference to the accompanying specification and drawings, in which—

Fig. 1 is an end elevation of one embodiment of the improvements in association with a bell and spigot joint, the spigot section being in section;

Fig. 2 is a section on line 2—2 of Fig. 1;

Fig. 3 is a section of the improved joint shown in Fig. 2, illustrating the relation of parts when the pipe sections are deflected, either when installed or by reason of subsequent movement of the pipes;

Figure 4:
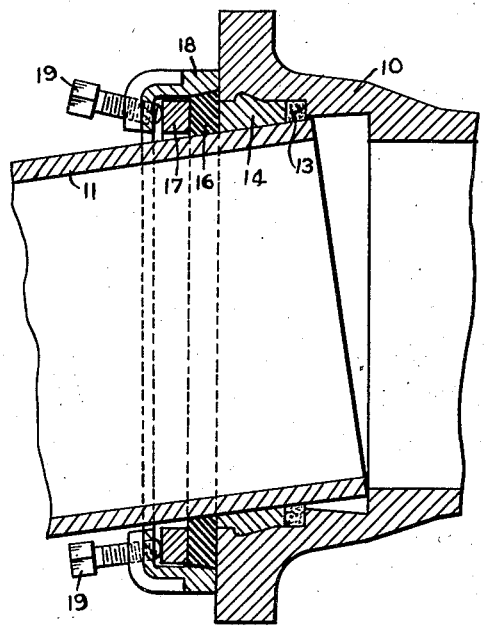
Fig. 4 is a section similar to Fig. 3 of the improvements illustrated in Figs. 1 to 3, the section illustrating the parts as if taken on line 4—4 of Fig. 1.

Referring to the drawings, the embodiment illustrated in Figs. 1 to 4 shows the improvements as applied to a bell and spigot section 10 and 11 respectively. The annular recess or seat in the bell section has a flared wall 12 for retaining and centralizing the spigot section and at the same time affording sufficient clearance for permitting deflection of the sections in a manner shown in Figs. 3 and 4, for example. The usual packing of yarn or jute 13 and lead 14 or other suitable materials is disposed between the adjacent peripheries of the overlapped pipe sections as illustrated. The foregoing primary sealing means constitutes the initial barrier intended to prevent escape of gas and pressure. The bell section 10 is provided with the usual annular flange or shoulder 15 as is common in this type of joint.

A secondary or supplementary sealing means includes an annular gasket or ring 16, a follower ring 17, a gland ring or housing 18, set screws 19 and bolts 20. The gasket 16, of one or more parts, may be composed of rubber or other suitable compressible, deformable material, and is provided about the spigot section 11. The gasket is of sufficient breadth to completely cover the lead seal 14 and to engage the end face of the bell section having a snug fit with the lead seal and the bell and spigot sections. The gasket is encircled by a metallic gland or housing which is securely held so as to confine the gasket and prevent it from spreading outwardly or radially. The inner periphery of the gland is slightly flared to facilitate installation.

The metallic follower or pressure ring 17 likewise encircles the spigot section and engages the face of the gasket. The gland 18 extends inwardly to a point adjacent the spigot section as illustrated, and thereby envelopes the gasket and follower ring so that they are substantially cut off from access of the outside air, elements and other agencies. The primary sealing means 13 and 14 are obviously completely isolated and excluded from any outside forces tending to cause deterioration thereof.

The bell section and the gland 18 are provided with a series of registering apertures 21 and 22 in which the bolts 20 are disposed for securing the gland and other parts in position. The series of set screws 19 are provided in the gland, as illustrated, and engage the follower ring 17 for compressing the gasket and sealing the joint, and at the same time cooperating with the gland and bolts, for providing an efficient and dependable structure. While the apertures 22 are preferably tapered as illustrated, the apertures 21 in the bell section which are illustrated as being tapered may be straight so long as sufficient clearance is provided to accommodate deflections of the bolts. The outermost ends of the apertures 21 and 22 are provided with countersunk beveled annular seats, as illustrated, and each bolt 20 is provided with an integral head 23 and a removable head 24, both of which have spherical or curved faces which engage and seat in the countersunk seats of the apertures, so that dirt, moisture and other materials are excluded from access to the interior of the apertures and from access to the threads of the bolts. This relation of parts is apparent upon inspection of Figs. 2 and 3, where it is seen that the bolt is housed by the sealed apertures.

In use in laying a pipe line the joint structure is adaptable for use with pipe sections that are aligned as seen in Fig. 2, or for pipe sections which are at an angle to each other, as seen in Fig. 3. This same joint is therefore adapted for use within the range of deflection illustrated in those figures, but it is useful for greater angles of deflection with suitable modifications. Likewise, the improved joint structure may be employed with pipe sections which are eccentrically aligned, as well as where they are concentrically disposed.

Furthermore, an outstanding advantage of the present improvements resides in the faculty of the improved joint for maintaining an effective seal not only at the time of installation and shortly thereafter, but for the effective life of the materials, regardless of the fact that the pipe sections may have experienced some movement relative to each other. It is well known that pipe sections after installation are subjected to a number of forces which impair the effectiveness of the seals. Among other factors, settling of the pipes, the action of frost or other elements, the roots of trees and other agencies contribute to deflection of the pipes underground with the attendant impairing of the seals. With the conventional pipe line of the mechanical joint type, when it is necessary to open up the ground to repair a leak at the joint, considerable trouble and difficulty is experienced, requiring the shutting off of the gas line and pressure until a new seal is applied.

With the present mechanical pipe joint, however, these difficulties are practically eliminated and reduced to the very minimum, due to the fact, among others, that the primary sealing means of lead and jute is completely covered and protected by the secondary sealing means and to the fact that the secondary sealing means is self operating. When a movement between the pipe sections occurs underground, the supplementary sealing means, if necessary, makes a corresponding shifting movement in a diametric or radial direction. This is due to the combination of structural features embodying the improvements. Should it be assumed that the joint is installed as illustrated in Fig. 2, but experiences deflection of a character and degree illustrated for example in Fig. 3, the secondary sealing means could shift itself from the position illustrated in Fig. 2 to that of Fig. 3, without impairing the seal. It is thus seen that the gland maintains a relation substantially concentric or coaxial with the spigot section even though it is secured to the bell section. Conversely, the improvements are self operative to shift themselves from a position such as shown in Fig. 3 to that of Fig. 2, for example.

When the pipes are assembled and the primary sealing means applied, the gasket 16, follower 17 and gland 18 are placed in position. These elements may be split rings or complete unbroken rings, as desired. The bolts 20 are inserted through the registering apertures 21 and 22 and the bolt heads 24 are tightened. Considerable pressure is employed in this operation to insure a compression of the metal of the gland about the apertures irrespective of the position of the bolts, whether parallel to the axis of the bell section or otherwise. The force experienced by the bolts is along their longitudinal axes so that there is no force operating to produce a twisting or torque in the bolts which is a well recognized fault in the commercial field. When the bolts have thus been tightened, the set screws 19 are advanced and tightened thereby compressing the gasket and completing the seal and at the same time producing a slight outward thrust to the inner portion of the gland which assists in effecting a tightening of the bolts 20 and produces a force which combined with the force applied to the bolt heads produces a resultant force effective along the axes of the bolts. With the structure thus installed any shifting movement which the gland is called upon to make, is permitted by the improvements, including the tapered apertures 22 and without impairment of the seal because, as any shifting movement occurs, the bolts 20, the gland 18, the set screws 19 and the back pressure of the gasket contribute to compensate for any infinitesimal looseness which might occur as the bolts shift position. The constant tendency of the gasket 16 to return to its original form (before being placed under pressure by screws 19) is believed to be a contributing force. In Fig. 3, it is notable that the side walls of the registering apertures provide a close fit with the bolt on diagonally opposite halves thereof.

The marked success of the present improvements commercially is believed to be attributable among other factors, to the ability of the supplementary sealing means to maintain itself substantially coaxial with respect to the spigot section and to the fact that the bolts 20 are always substantially parallel to the spigot section irrespective of the position of the latter relative to the bell section. A marked advantage of the improvements resides in the fact that it is possible to remove the holding bolts 20 and slide the entire gland, pressure ring and gasket away from the end face of the bell section and along the spigot section while the pipe line is in operation. This can be accomplished, for applying new gasket material without cutting off the gas or pressure. The protected primary seal is sufficient to prevent excessive leakage while the new gasket is being installed.

Figure 5:
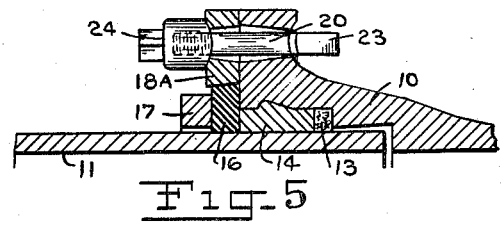
Fig. 5 is a fragmentary half section of a joint illustrating a modified form.
Figure 6:
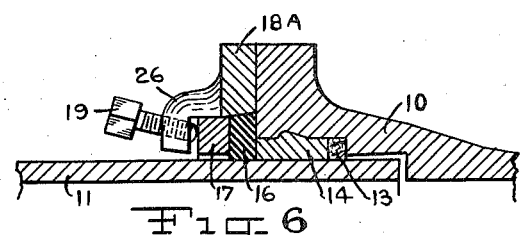
Fig. 6 is a view similar to Fig. 5, of the same modified form, showing the relation of parts at another point in the circumference of the joint.

Referring to the modified form in Figs. 5 and 6, it is seen that the parts are, for the most part, the same as in the form previously described. In this form, however, the gland 18A is modified so that the pressure ring 17 is not completely confined. A plurality of spaced arms 26 carrying the set screws 19 are provided on this modified gland 18A. This form functions in the same manner as that previously described, it being noteworthy that the arms 26 are radially disposed and are radially adjustable and shiftable. The bolts 20 permit attachment or removal of the gland or ring in the manner aforementioned.

Figure 7:
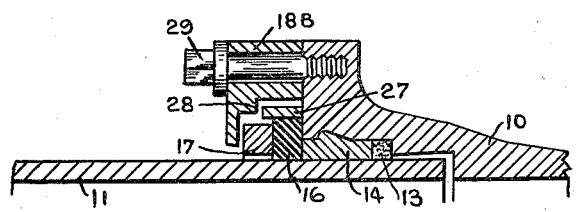
Fig. 7 is a fragmentary half section of another modified form.

In circumstances where it is necessary to use a joint with a gland in fixed position, the form in Fig. 7 is provided. In this form, the outer face of the gasket 16 is confined by a separate keeper ring 27 which is slightly spaced from the inner periphery of the gland 18B, a sufficient distance to allow for radial adjustability and shiftability. A shoulder 28 is provided in the gland 18B to prevent movement of the keeper ring 27 away from the end face of the bell section. The gland is anchored to the bell section in any desired manner, as for example by bolt 29. In this form the members 16, 17 and 27 take part in the shifting movement, if any is necessary.

Figure 8:
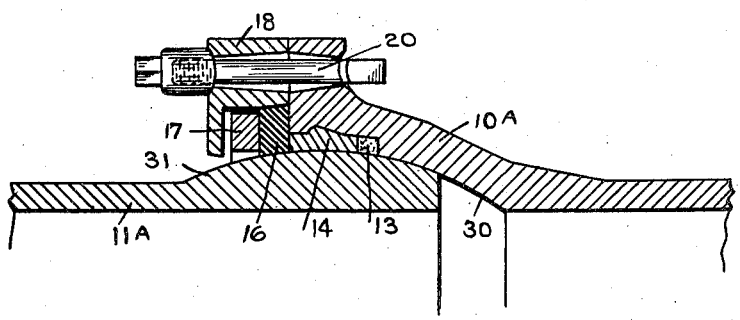
Fig. 8 is a fragmentary half section of a spherically shaped bell and spigot joint, illustrating the improvements of the form of Fig. 2 applied thereto.

The joint in Fig. 8 shows the adaptability of the present improvements to a spherically shaped pipe connection. This may be desirable for use where extreme flexibility is required and where substantial movements due to settlement or other agencies can be foreseen. In this form, the bell section 10A has a concave inner periphery 30 while the spigot section 11A has a convex outer periphery 31. The dimensions of the secondary sealing means are such as to permit the application thereof over the end or maximum diameter of the spigot section. While the form of the improvements illustrated in Figs. 1 to 4 have been shown in connection with the joint in Fig. 8, it is obvious that the modified forms illustrated herein and others are equally adaptable.

Figure 9:
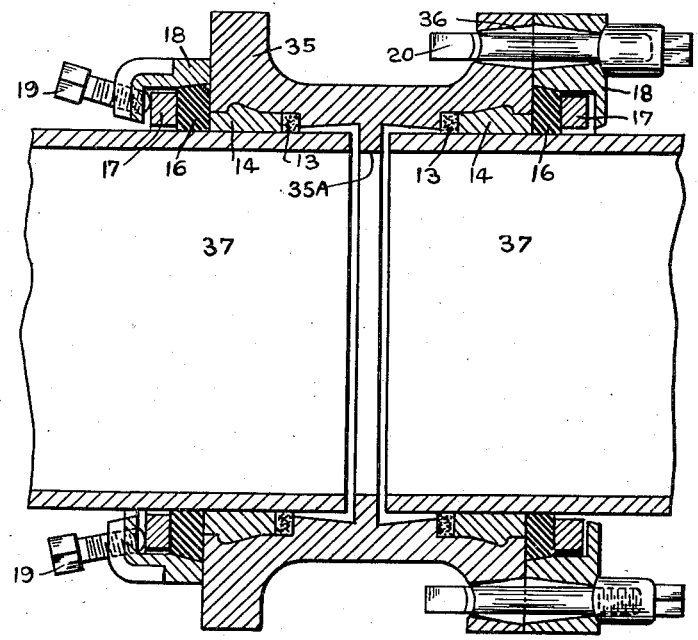
Fig. 9 is a section illustrating the improvements as applied in pipe couplings.
Figure 10:
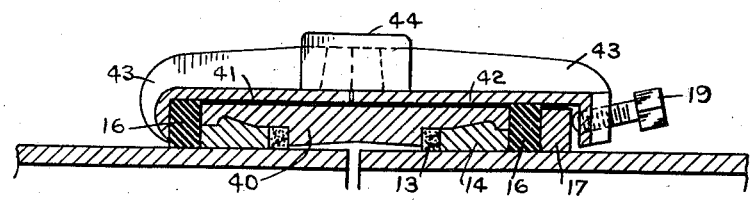
Fig. 10 is a fragmentary half section of a modified form of pipe coupling.

The range of application of the present improvements will be seen to be considerably extended upon reference to the modified forms in Figs. 9 and 10. The improved joints are therefore not confined to use with overlapping pipe sections of the bell and spigot character. The advantages and functions set forth with respect to the forms earlier described are likewise achieved in the forms illustrated in Figs. 9 and 10, where plain end, cast iron or steel pipe sections are employed. Referring to Fig. 9, a short sleeve coupling member 35 having flanged ends is provided with apertures 36 for receiving the bolts 20. This member 35 is an overlapping pipe section and is provided with the usual annular recesses for receiving the longer pipe sections 37 and the primary sealing means. Any preferred form of secondary sealing means as disclosed in the present embodiments or others within the scope of the present improvements may be employed.

In the present instance, the form illustrated in Figs. 1 to 4 have been shown. It is understood, of course, that the glands 18 illustrated in Fig. 9 are alike at both ends of the sleeve 35, that is to say, each is provided with the set screws 19 and bolts 20 about their circumferences. The functioning of the coupling at the time of installation and thereafter is the same as set out more fully with respect to the form first described.

Where rather long sections of plain end pipe are welded together and couplings are used only at intervals to provide for expansion and contraction, the form illustrated in Fig. 9 may be altered slightly so as to adapt it for such use. This may be accomplished by lengthening the sleeve 35 and eliminating the annular tongue 35A.

Referring more particularly to Fig. 10 the modified coupling includes an inner ring 40 having annular recesses at each end for holding the primary sealing means. Gaskets 16 are provided as illustrated and annular shells 41, 42 abutting each other encircle the ring 40 and gaskets. A follower ring 17 engages one gasket as illustrated, while the other gasket is engaged by an inturned flange of the shell 41. The shells 41 and 42 are provided with integral ribs 43 at regularly spaced intervals about their circumferences. Each rib holds a pressure screw 19 which exerts pressure against the follower ring and gasket. This pressure is transmitted through the shells 42 and 41 to the other end of the coupling and confines the gasket there, thus providing a complete seal at each end of the coupling. The ribs 31 are provided with shoulders and a saddle-like member 44 operating in the nature of a clip or clamp disposed over the ribs and aforementioned shoulders, for holding the shell sections 41, 42 together.

Figure 11:
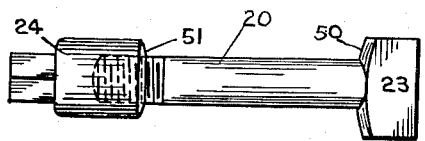
Fig. 11 is a side elevation of a novel type of retaining bolt.

Upon reference to Fig. 11 the details of the improved bolt 20 may be observed. As previously described, the bolt has an integral head 23 and a removable head or cap nut 24 which is bored and threaded only part way from its inner face. The end of the bolt is correspondingly threaded so that the head 24 may be applied thereto without permitting access of foreign matter to the threads through the head. The innermost face 50 of head 23 is curved in two directions so as to present, preferably, a spherical surface for seating at the mouth of the apertures 21. The inner surface 51 is likewise curved or spherically surfaced for seating at the mouth of apertures 22. In this manner the force transmitted from one head to the other will be uniformly distributed around the circumference of the bolt body for any angle of bolt with relation to the bolted surfaces.

Figure 14:
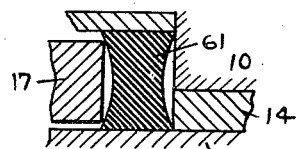
Fig. 14 is a view similar to Fig. 12 showing a modified form of gasket.
Figure 15:
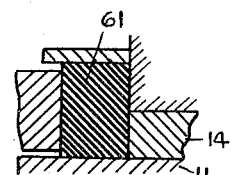
Fig. 15 is a view showing the gasket of Fig. 14 after pressure has been applied.
Figures 12, 13:
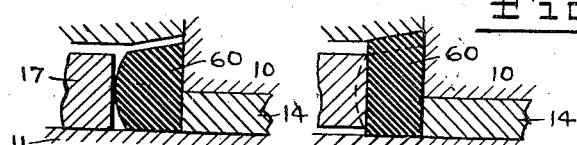
Fig. 12 is a detail in section showing an improved form of gasket in position before pressure is applied.
Fig. 13 is a section of the parts shown in Fig. 12 after pressure has been applied.

Upon reference to Figs. 12 and 14, improved forms of gaskets are illustrated. In each proved form the outermost face, namely, that adjacent the follower ring 17 is bowed or curved. In Fig. 12, the face of the gasket 60 is curved outwardly while in Fig. 14, the face of the gasket 61 is curved inwardly. In the form in Fig. 12 the gasket 60 has its outer face beveled and fits snugly with the spigot section 11 and bell section 10. When the ring 17 applies pressure to the gasket it assumes a new shape as shown in Fig. 13. A snug fit is therefore provided at all points due to the deforming of the gasket, and the effectiveness of the seal is thereby enhanced. In the form in Fig. 14 pressure from the ring 17 on the gasket 61 will cause it to deform to the shape illustrated in Fig. 15. This provides a close contact and increases the sealing value at the four corners of the gasket. Obviously, the forms of the gaskets may be varied without departing from the novel functions attained by the disclosed forms.

If desired, a plastic composition of coal tar, bitumen or other base may be applied along the glands and spigot sections.

While the present improvements have been disclosed in a number of preferred embodiments, it is to be noted that they are merely exemplary and that various other forms and embodiments may be apparent to those skilled in the art without departing from the scope and purview of the invention. For example, it may be preferable and more convenient to dispense with set screws 19 and have some portion of the glands 18, 18A, etc. directly engage the pressure rings 17. Likewise, the glands may be secured by some retaining means other than that described and illustrated herein and for that reason the present improvements are not limited to any particular form of retaining means or pressure applying media.

We claim:

1. A pipe joint comprising pipe sections having overlapped ends, a gasket, a gland encircling said gasket and abutting the end face of the overlapping pipe end, tapered apertures through said gland, means on said gland for holding said gasket in position, and means extending through said apertures and engaging one of the pipe sections for securing the gland.

2. A pipe joint of the bell and spigot type comprising a gasket encircling the spigot section, a gland encircling said gasket and engaging the end face of the bell section, tapered apertures through said gland, means on said gland for holding said gasket in position, apertures in said bell section aligned with said tapered apertures, and bolts in said aligned apertures for maintaining said gland in position.

3. A pipe joint of the bell and spigot type comprising a gasket encircling the spigot section, a gland encircling said gasket and abutting the end face of the bell section, tapered apertures through said gland, means on said gland for holding said gasket in position, tapered apertures in said bell section aligned with said first named apertures, and bolts in said aligned apertures for maintaining said gland in position.

4. A pipe joint of the bell and spigot type comprising a gasket encircling the spigot section, a gland encircling said gasket and engaging the end face of said bell section, registering apertures in said gland and bell section, bolts in said apertures engaging said gland and bell section, portions of said registering apertures having materially greater diameters than the diameters of the contiguous bolt portions, whereby non-alignment of the gland and bell section, within limits permitted by the pipe sections, affords accommodation for the bolts in said apertures.

5. A pipe joint of the bell and spigot type comprising a primary sealing means between the inner and outer peripheries of the pipe sections, a secondary sealing means including a gasket encircling the spigot section, and covering the primary sealing means, protective means for said primary sealing means and for said gasket including a gland engaging the end face of said bell section and encircling said gasket and spigot section, tapered apertures in said gland, and bolts in said apertures engaging said gland and bell section.

6. In a pipe joint of the bell and spigot type having the spigot section disposed at an angle to the bell section, a gasket encircling said spigot section, gasket-maintaining means therefor and engaging the end face of the bell section, bolts substantially parallel to said spigot section for securing said maintaining means in position said bolts having associated therewith means for maintaining the relation of said bolts and spigot section during subsequent deflection of the spigot section.

7. A pipe joint for bell and spigot type sections comprising a primary sealing means disposed between the adjacent peripheries of the overlapped pipe sections, a gasket encircling said spigot section and covering said first means, a gland encircling said gasket and engaging the end face of said bell section, a follower ring engaging said gasket, means on said gland for exerting pressure on said ring and gasket, said bell section and gland having a series of registering apertures, the apertures in said gland being tapered, and a series of bolts disposed in said apertures.

8. A pipe joint comprising two pipe sections, one pipe section having an overlapping end defining a seal housing, a primary sealing means within said housing, a self adjustable secondary sealing means outside of said housing, a gland encircling said secondary sealing means and disposed in contact with the end face of said housing, said gland being laterally adjustable, with respect to said primary sealing means, means on said gland for maintaining said sealing elements in sealing position, and means for securing said gland and housing in abutment, irrespective of the relative positions of said pipe sections.

9. In a pipe joint having overlapping pipe ends, sealing means for said joint, a gland including portions rigid therewith enveloping said sealing means, said gland adapted to engage the end face of the overlapped pipe, means for maintaining said gland and pipe end in abutment in a common plane said maintaining means having associated therewith means for preserving the aforesaid relation of gland and pipe end irrespective of their eccentric relation to each other.

FRANK A. ENGEL.
FRANKLIN HUDSON.